Aug. 26, 1941.   F. L. DARLING   2,253,691
HOSE CLAMP
Filed Nov. 6, 1939
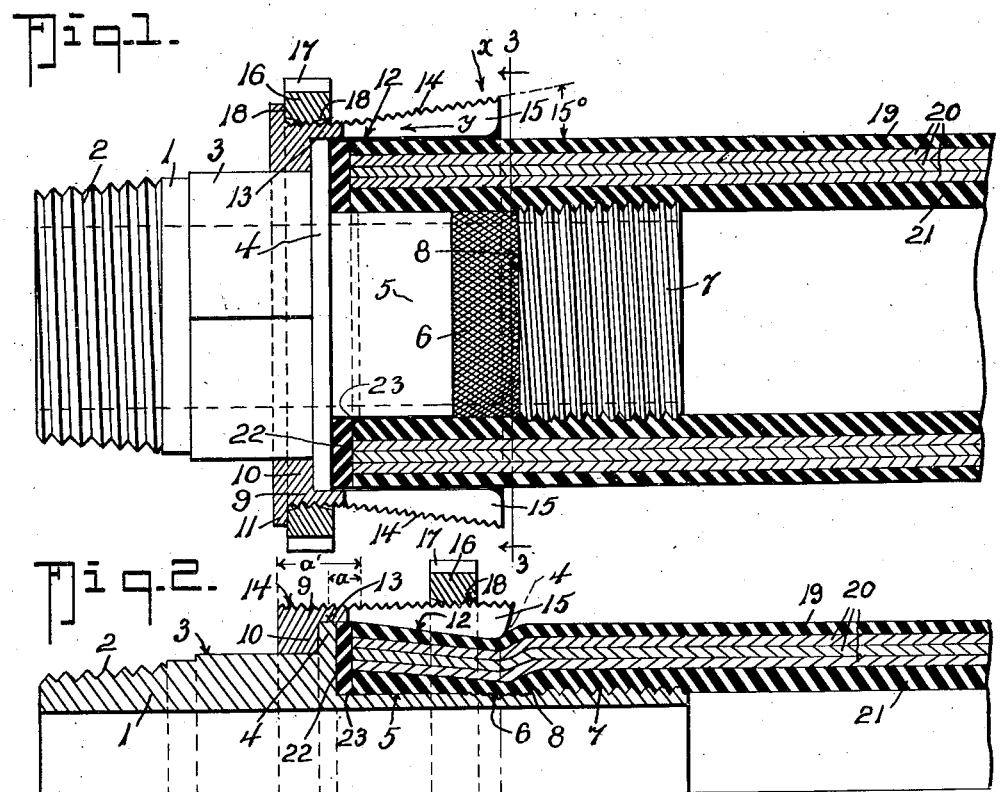
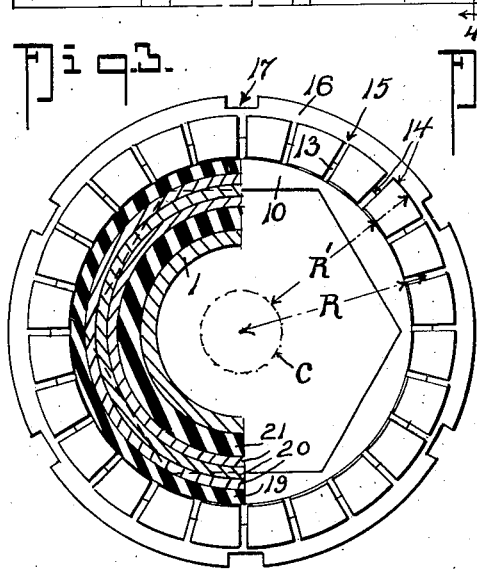
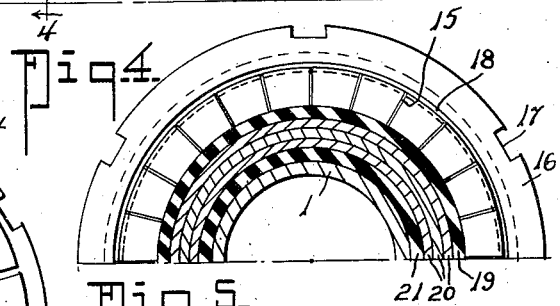
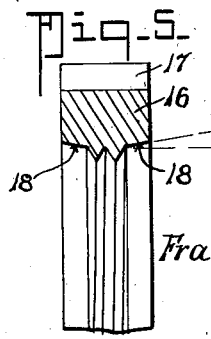
Inventor
Frank L. Darling
By Dieterich & Rutley
Attorneys.

Patented Aug. 26, 1941

2,253,691

UNITED STATES PATENT OFFICE 2,253,691

HOSE CLAMP

Frank L. Darling, Hollywood, Calif., assignor to Wingfoot Corporation, Wilmington, Del., a corporation of Delaware Application November 6, 1939, Serial No. 303,124

2 Claims. (Cl. 285—86)

My invention relates to certain new and useful improvements in devices for securing flexible and elastic hose to metal pipes, nipples, etc., and the present invention has for an object to provide certain modifications and improvements on the hose clamp which constitutes the subject matter of my application filed August 25, 1939, Serial No. 291,966, now Patent No. 2,205,347 granted June 18, 1940.

Primarily the present invention has for its object to provide means by the use of which the hose end can be brought up into contact with the end-sealing elastic washer before the clamping force is applied; to provide a clamp so combined with the nipple that after the clamping action has been applied and the clamp set it will be impossible to pull the hose off the nipple; to provide an arrangement of parts which can be conveniently manufactured at low cost; and to provide a clamp that can be used over and over again as the hose wears out and must be replaced.

Other objects will in part be obvious and in part be pointed out hereinafter.

To the attainment of the above objects and ends the invention still further resides in those novel features of construction, combination and arrangement of parts, all of which will be first fully described in the detailed description and then be particularly pointed out in the appended claims, reference being had to the accompanying drawing, in which:

Fig. 1 is a vertical, central, longitudinal section of a hose coupling, the nipple being shown in elevation.

Fig. 2 is a detailed longitudinal section similar to Fig. 1 but showing the clamp closed, a slightly modified clamp being shown.

Fig. 3 is a cross section about on the line 3—3 of Fig. 1, one half the hose and nipple and end-sealing washer being removed.

Fig. 4 is a detail cross section on the line 4—4 of Fig. 2.

Fig. 5 is an enlarged detail section of the nut.

In the drawing, in which like letters and numerals of reference indicate like parts in all the figures, 1 is the nipple, which, at one end, may be threaded, as at 2, to screw into a fixture (not shown). The nipple includes a nut-like portion 3, an annular flange or collar 4, a smooth-surface area 5 adjacent the flange 4, a threaded end 7 and a knurled or roughened surface 6 between the smooth surface 5 and the threaded portion 7 as clearly shown in Fig. 1.

The outside diameter of the smooth surface 5 and that of the knurled surface 6 are substantially the same but the outside diameter of the threaded end 7 of the nipple is somewhat greater than that of the knurled surface 6, thereby presenting a shoulder 8 at the juncture of the knurled and threaded portions 6 and 7 respectively, the purpose of which will later appear.

The main clamp member is of substantially the same general form as that of my previous application above mentioned. However, structurally it differs somewhat therefrom. In the present case, the main clamp member comprises a tubular body having, at one end, an internal web 10 which is shaped to fit on the portion 3 of the nipple and lie against the flange 4 thereof. It also includes an annular series of clamping fingers forming a continuation of the cylindrical part 9 of the body. These fingers are formed by slitting the body inwardly from the end opposite that having the web 10, the slits 15 extending inwardly a predetermined distance, but terminating short of the web 10 so as to leave a portion of the body between the outer flange 11 and the fingers solid or un-slit.

The main clamp member is preferably made according to the method taught in my application for patent filed June 6, 1939, Serial 278,357, that is to say the blank from which the clamp is made has its outer surface cylindrical from end to end (as in Figure 2) and its inner wall at the finger area is frusto-conical in form. After the thread is cut on the outer face from end to end (Fig. 2) or from one end to the flange 11 (Fig. 1) the body is slit or split at frequent intervals, as at 15, the slits extending from the end opposite the web 10 to adjacent the same, but terminating short of same by preferably slightly more than the thickness of the nut 16 which cooperates with the fingers formed in the body between the slits 15.

When an outer flange 11 is used the nut is first run onto the body and then an arbor is passed into the body to spread the fingers so that the inner faces of the fingers will assume a parallel relation to the body (see Figures 1 and 3) while the outer threaded faces of the fingers flare outwardly and the body assumes a generally frusto-conical form with the end of lesser diameter adjacent the nut 16. When no flange 11 is used the threads extend to the end of the body 9 (see Figure 2) and the nut can be screwed on from this end after the fingers have been spread.

Experience has shown that it is necessary that the fingers be formed of a hard metal that will not bend under the strains and stresses encountered in practice; if the entire body (fingers included) be made of a metal that is hard throughout, unless the metal be very thin at the junction of the fingers with the body part 9 (in which event repeated attempts to re-use the clamp—as when hose replacements become necessary—fracture of the hard material at the base of the fingers is likely to and sometimes does occur), it is almost impossible to bend the fingers inwardly by screwing on the nut. If the metal be soft enough throughout to permit the nut being screwed over the fingers, it has been found that the fingers bend or curl up so that the proper action of the fingers on the hose cannot be had. I have therefore found that by forming the clamp of hard metal—such, for example, as phosphor-bronze,—and annealing a portion adjacent the inner end of the slots, as at $a$, Figure 2, for example, thus forming, as it were, ductile hinges for the fingers, the nut could easily be forced over the fingers without either stripping the threads or curling or deforming the fingers. If desired, the annealed area could extend to the web end of the body, as at $a^1$, Figure 2.

In the present embodiment of my invention, as in that disclosed in my application Ser. No. 291,966 aforesaid, the nut 16 has beveled surfaces 18 the angle of which to the axis is the same, or approximately the same, as that of the outer faces of the tongues when the clamp is open and in position ready for use (Fig. 1), while the nut-threads are located between the surfaces 18—18 as will be clear by reference to Fig. 5. This enables the nut to be used either side forward and also provides as it were a funnel guide to assist in swinging the finger ends inwardly toward the axis of the clamp and in relieving the nut threads of a large part of the thrust strains which would otherwise tend to twist or roll the body of the nut. By the arrangement just described the line of radial thrust by the nut is located close to the center of the nut.

The outer face of the nut 16 may have ordinary flats for an ordinary wrench, or it may be provided with spanner wrench recesses 17, as shown, or it may be circular and be operated by a strap wrench. The particular shape of the outer wall of the nut is of no consequence and is, per se, no part of the present invention.

I have found that by providing the nipple with a knurled surface 6 and a smooth surface 5 between the surface 6 and the flange 4, and by making the threaded part 7 of a greater diameter than the knurled part to provide a slight shoulder 8 close to the radial lines of greater pressure applied to the hose by the finger ends, the hose will not slip off the nipple under maximum force applied to the hose, nor will a leak occur.

The hose end-sealing washer 22 has a bevelled center portion 23 which, in the present case faces the hose 19, 20, 21.

In applying the invention, the washer 22 is slipped into place on the nipple and then the nipple is screwed into the end of the hose until the washer 22 is brought snugly against the hose end and the washer held in contact with the flange 4.

The clamp with fingers open, i. e. their inner faces 12 lying parallel to the axis of the nipple and of the unslit cylindrical part 13 of the body, is slipped over the parts 2 and 3 of the nipple and over the end of the hose until the web 10 engages the flange 4. The nut 16 is then run over the threaded part 14 of the fingers. Since the inner diameter of this nut remains constant as soon as the nut passes over the inner ends of the fingers they will be forced to act as levers hinged at their inner ends. Since the fingers are thicker at their outer ends than they are adjacent the body part 13 as they are squeezed in the rubber of the hose will be displaced and squeezed toward the flange in the direction of arrow $y$ in Figure 1 and at the same time the web 1 will be pulled tightly against the flange 4. The pressure against the washer 22 (which is also elastic) serves to cause it to fill any voids in the end of the hose. The direction of swing of the fingers upon screwing up the nut is indicated by the arrow $x$ in Figure 1.

Since the hose, composed usually of rubber 19, 21 and fabric 20, is resilient, it will be squeezed onto the nipple with ever increasing pressure as the nut 16 is advanced. The resiliency of the hose tends to spread the fingers and consequently to cause them to engage the nut more tightly.

The spreading force acting on the fingers tends to cause a displacement of the threads from strict alignment with one another (the displacement being greater toward the free ends of the fingers) and this causes a very tight engagement and more or less binding of the threads of the nut and fingers, which prevents jars and vibrations from loosening the nut or causing it to work toward the hinge end of the fingers.

By annealing the clamp body at the inner ends of the fingers the fingers have little or no inherent tendency to spring outwardly, the outward "spring" that applies the force above referred to which tends to hold the nut against working off is applied by the resiliency of the hose.

In practice, it is preferable to tighten the nut 16 until the outer edges of the threads 14 lie almost in a cylindrical surface, a place where a maximum squeeze is effected without running the nut too close to the edge of the body.

As will be seen by reference to Figure 3, when the fingers are spread, the radii $R^1$ of the free ends are centered in a circle C, the radius of which is equal to the distance that the said outer ends are spread from the initial position to the spread. Due to the ductile hinge at $a$ it is possible to remove the clamp body by simply running back the nut 16 onto the cylindrical part 13 and spreading the fingers by inserting a screw driver or other similar tool between the free ends of the fingers and the hose and prizing them apart. The clamp body can then be slipped off and the nipple unscrewed from the hose.

The threads 7 are preferably made as dull threads so as not to destroy the inner surface of the hose but simply to displace the rubber into the form of a mating thread.

By the use of a threaded end nipple instead of a nipple having the usual rings, nibs and other similar protuberances over which the hose is pushed, it is possible to make sure that the end of the hose is brought up as close as possible to the washer 22 and flange 4 before the clamping pressures are applied. Further the provision of the thread 7 makes it possible to assemble the hose and nipple with minimum effort as by applying a wrench to the nut portion 3 of the nipple as much leverage as desired can be had.

It is further to be noted that the nipple extends a substantial distance beyond the end of the clamp member and thus serves to brace or reinforce the hose, and prevent its breaking adjacent the clamp due to side pull on the hose in use.

From the foregoing description, taken in connection with the accompanying drawing, it is thought the complete construction, combination, and arrangement of parts and the advantages of the invention will be clear to those skilled in the art.

What I claim is:

1. A hose clamp comprising a one-piece tubular body having an inwardly extending web forming a restricted opening in said body, said body being threaded on its outer face and being slit longitudinally from one end thereof at least to a position near said web to thereby form radially movable fingers intermediate said slits, said fingers being of greater radial thickness adjacent their outer or free ends than adjacent said web, the material of said body at the bases of said fingers being ductile and the fingers being relatively stiff to prevent curling under clamping pressures, a nut having an inside diameter substantially the same as the outside diameter of the unslit threaded part of said body and threaded on said body, a nipple having a portion with a peripheral cross-sectional shape at one end, to pass through the opening formed by said web, and a limiting flange on said nipple engageable with said web to limit the axial movement of said nipple, said flange, when in operative position, being arranged on the side of said web nearest said fingers; whereby when the clamping pressure of said fingers is exerted on a hose end, longitudinal movement of said flange away from said hose end is resisted by the engagement of said flange with said web.

2. A device as set forth in claim 1 in which the adjacent peripheral portions of said nipple and flange which lie opposed to each other when said web and flange are in engagement, are so shaped as to interlock and prevent relative rotation between said nipple and web.

FRANK L. DARLING.